United States Patent [19]

Iwata

[11] Patent Number: 4,864,888
[45] Date of Patent: Sep. 12, 1989

[54] ROBOT ARTICULATION JOINT

[75] Inventor: Masanari Iwata, Nagoya, Japan

[73] Assignee: Mitsubishi Denki Kabushiki Kaisha, Tokyo, Japan

[21] Appl. No.: 179,807

[22] Filed: Apr. 11, 1988

[30] Foreign Application Priority Data

Apr. 13, 1987 [JP] Japan .................................. 62-90032

[51] Int. Cl.⁴ ...................... F16H 33/00; F16H 35/00; F16H 37/00; F16C 10/06
[52] U.S. Cl. ........................................ 74/640; 901/23; 901/28; 403/161
[58] Field of Search ...................... 74/640; 901/28, 27, 901/29, 23; 285/123, 185, 119, 907; 403/113, 112, 161

[56] References Cited

U.S. PATENT DOCUMENTS

| | | | |
|---|---|---|---|
| 1,551,332 | 8/1925 | Schramm | 403/78 X |
| 3,108,498 | 10/1963 | James et al. | 901/29 X |
| 4,096,766 | 6/1978 | Pardo et al. | 74/640 |
| 4,372,728 | 2/1983 | Murakami | 901/29 X |
| 4,518,308 | 5/1985 | Grzybowski et al. | 414/735 |
| 4,547,120 | 10/1985 | Turner, Jr. et al. | 414/744 R |
| 4,678,952 | 7/1987 | Peterson et al. | 901/29 X |
| 4,690,010 | 9/1987 | Matsumoto et al. | 901/28 X |

FOREIGN PATENT DOCUMENTS

| | | | |
|---|---|---|---|
| 2228598 | 1/1974 | Fed. Rep. of Germany . | |
| 2599568 | 12/1987 | France | 901/28 |
| 62-48485 | 3/1987 | Japan . | |
| 62-07450 | 12/1987 | Japan | 901/28 |
| 63-00515 | 1/1988 | Japan | 901/29 |
| WO85/01686 | 4/1985 | PCT Int'l Appl. . | |

Primary Examiner—Leslie A. Braun
Assistant Examiner—Harold F. Macris
Attorney, Agent, or Firm—Sughrue, Mion, Zinn, Macpeak and Seas

[57] ABSTRACT

An articulated robot joint includes a coupling member 13 having a hollow cylinder 13a rigidly mounted to a lower arm 2 and rotatably journaled to an upper arm 1. An offset crank 13c extends from one end of the cylinder, and has a mounting hub 13d at the end of a radial arm thereof coupled to an axially disposed output shaft of a motor and harmonic drive unit 5, 6. A power/control cable 3 is threaded through the hollow interiors of the arms, and traverses the joint via the hollow cylinder.

5 Claims, 1 Drawing Sheet

ROBOT ARTICULATION JOINT

BACKGROUND OF THE INVENTION

This invention relates to an articulated joint construction for an industrial robot.

FIG. 1 shows a joint construction of this type known to the inventor, wherein a lower arm 2 is pivotally coupled to an upper arm 1 via a shaft 11 rigid with the lower arm. The rotational driving force is supplied by a motor 5 mounted to the upper arm and whose output shaft is keyed at 7 to a harmonic drive 6 of the type described in U.S. Pat. No. 4,096,766. The lower, output end of the harmonic drive rotates at a much slower speed than that of the motor 5, and is fixedly coupled to an upper end of the shaft 11 above its journal in a bearing 8. Reference numeral 9 designates a stopper ring, and 10 is a spacer sleeve. A flexible cable 3 carrying power lines, detection and control signal lines, pneumatic and/or hydraulic lines, etc. is threaded through the interiors of the upper and lower arms, and is by-passed around the articulation joint in a bight via sealing bushes 4 of rubber or the like.

A disadvantage of such construction resides in the externally exposed bight of the cable 3, which is prone to becoming caught by or hung up on portions of the workpiece and/or adjacent equipment, and which can thus become ruptured or severed and thereby create a serious industrial hazard.

In another known construction as described in Japanese kokai No. 62-48485 the cable 3 is threaded through the interior of the joint and is thus not externally exposed. With this construction the drive motor is disposed within one of the robot arms remote from the joint axis, however, and a power transmission mechanism including gears, belts or the like must thus be provided. This complicates the overall construction and attendantly increases the cost thereof, and further results in the generation of considerable dust and other contaminants due to the numerous moving parts required, which renders such an arrangement unacceptable for the use in a "clean" robotics environment such as an electronics components fabrication or assembly installation.

SUMMARY OF THE INVENTION

The drawbacks and disadvantages attendant with the known constructions as described above are overcome in accordance with the present invention by providing an articulated joint assembly for an industrial robot wherein the flexible power/control cable is threaded through the interiors of the robot arms and the joint with no external exposure via a hollow cylindrical pivot shaft rigidly secured to one of the arms and coupled to an output end of a harmonic drive and motor assembly mounted coaxially in the other arm by a crank arrangement.

DETAILED DESCRIPTION OF THE PREFERRED EMBODIMENT

Figure 1:
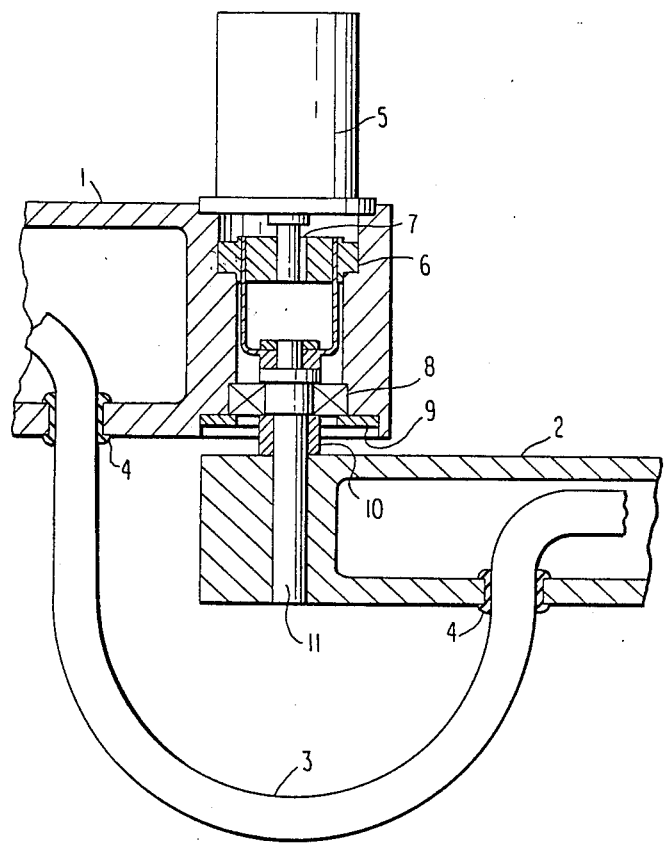
FIG. 1 is a sectional view showing a known articulated joint for robot arms.
Figure 2:
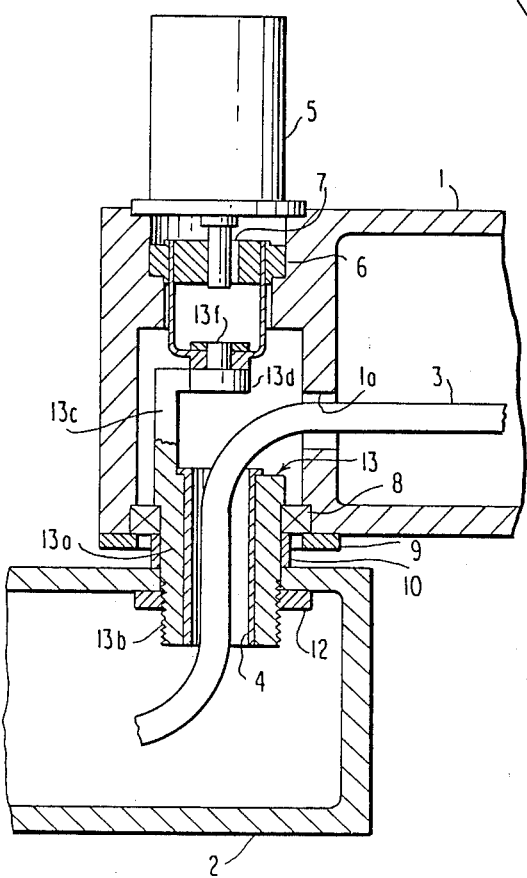
FIG. 2 is a sectional view showing an articulated joint for robot arms in accordance with the invention.
Figure 3:
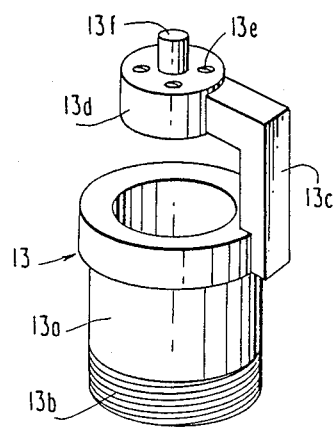
FIG. 3 is a perspective view of the pivot shaft and crank construction embodied in FIG. 2.

Referring to FIGS. 2–3, wherein the reference numerals used in FIG. 1 designate the same or similar components, the lower end of a coupling member 13 is configured as a hollow cylinder 13a threaded at 13b and rigidly coupled to the lower arm 2 by a nut 12. A keyway or the like may also be provided between the cylinder 13a and its aperture in the lower arm 2 to prevent any relative rotation between the two members. A crank 13c integral with the hollow cylinder extends upwardly and radially inwardly from one edge thereof, and carries a circular mounting hub 13d at its opposite end having tapped bolt holes 13e spaced around its periphery and an upstanding stub shaft 13f coaxial with the cylinder 13a. The stub shaft is accommodated in a centered aperture in the lower, output end of the harmonic drive 6, and the hub is secured thereto by bolts (not shown) engaged in the tapped holes 13e. As may be seen in FIG. 2, the flexible power/control cable 3 is threaded through and housed completely within the interiors of the upper and lower robot arms 1, 2, and axially traverses the articulation joint by passing through a bushing 4 secured to the inside of the cylinder 13a, which serves to protect the cable against abrasive wear and damage.

The joint is assembled such that the crank 13c of the coupling member is disposed diametrically opposite an aperture 1a in the upper arm through which the cable is threaded when the two arms lie parallel to each other, which enables a rotational drive of the lower arm 2 through almost 180° in either direction before any limiting contact occurs between the crank and the cable 3. The rotational drive of the lower arm in excess of 180° in either direction may be implemented by configuring the cable aperture 1a as an elongate horizontal slot, in which case the crank 13c simply pushes the cable to one side or the other in the slot upon engagement.

As various alternatives, among others which will be readily apparent to those skilled in the art, the harmonic drive 6 may be eliminated and the output shaft of a suitable drive motor embodying a reduction gear mechanism may be connected directly to the mounting hub 13d of the coupling member, two or more spaced bearings may be used to journal the cylinder 13a of the coupling member instead of a single bearing 8 as disclosed, the entire joint assembly may be reversed or inverted with the motor 5, harmonic drive 6, crank 13c, etc. installed in the lower arm 2 instead of the upper arm 1, and the arm mounting the motor and harmonic drive may constitute a stationary base of the robot rather than a movable arm thereof.

As will be apparent from the foregoing, the elimination of the external bight of the cable 3 reduces the industrial hazard level, and the simplified coupling member arrangement reduces the number of moving parts and thus the cost of the construction, and attendantly reduces the dust and contaminants generated by such parts to thereby enable the use of the invention in a "clean" industrial environment.

The necessary power and control lines for the motor 5, typically embodied in the cable 3, have been omitted in the interest of simplicity.

What is claimed is:

1. An articulated joint for rotatably coupling first and second hollow robot arms (2, 1), comprising:

(a) a coupling member (13) comprising a hollow cylinder portion (13a) having an axis radially central to the cylinder, a member (13c) extending from one end of the cylinder portion parallel to and radially offset from said axis, and a mounting hub (13d) integral with a distal end of the offset member and coaxial with the cylinder portion, (b) means (12, 13b) rigidly and non-rotatably mounting the cylinder portion to an end region of the first robot arm (2) such that said cylinder portion communicates with an interior of the first arm, (c) means (8) rotatably mounting the cylinder portion to an end region of the second robot arm (1) such that said cylinder portion communicates with an interior of the second arm and the offset member and mounting hub are disposed within said second arm interior, (d) drive means (5, 6) rigidly mounted to the second arm and having an output shaft disposed coaxially with the cylinder portion and rigidly coupled to the mounting hub, and (e) a flexible cable (3) carrying power, signal and/or control lines threaded through the hollow interiors of the first and second arms and traversing the joint via the hollow cylinder portion.

2. A joint according to claim 1, wherein the drive means includes a motor (5), and a harmonic drive (6) mechanically interposed between an output shaft of the motor and the mounting hub.

3. A joint according to claim 1, wherein the offset member is configured as a crank.

4. A joint according to claim 1, wherein a resilient bush sleeve (4) is interposed between the hollow cylinder portion and the cable to protect the cable against abrasive wear and damage.

5. A joint according to claim 1, wherein a distance between the offset member and a proximate end of the second arm is minimum when the first and second arms are disposed parallel to each other.

* * * * *